(12) United States Patent
Tsuzuki et al.

(10) Patent No.: US 11,742,548 B2
(45) Date of Patent: *Aug. 29, 2023

(54) ELECTRICAL STORAGE DEVICE AND ELECTRICAL STORAGE MODULE

(71) Applicants: Panasonic Corporation, Kadoma (JP); TOYOTA JIDOSHA KABUSHIKI KAISHA, Toyota (JP)

(72) Inventors: Kouhei Tsuzuki, Hyogo (JP); Tetsuji Omura, Hyogo (JP); Goro Fujita, Osaka (JP); Katsunori Yanagida, Hyogo (JP); Yoshitaka Minamida, Nagoya (JP)

(73) Assignees: PANASONIC HOLDINGS CORPORATION, Osaka (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 242 days.

This patent is subject to a terminal disclaimer.

(21) Appl. No.: 17/146,700

(22) Filed: Jan. 12, 2021

(65) Prior Publication Data

US 2021/0226294 A1 Jul. 22, 2021

(30) Foreign Application Priority Data

Jan. 16, 2020 (JP) ................. 2020-004990

(51) Int. Cl.
*H01M 50/291* (2021.01)
*H01M 50/209* (2021.01)
(Continued)

(52) U.S. Cl.
CPC ......... *H01M 50/291* (2021.01); *H01M 4/133* (2013.01); *H01M 4/366* (2013.01);
(Continued)

(58) Field of Classification Search
CPC ........ H01M 4/133; H01M 4/134; H01M 4/38; H01M 4/587; H01M 4/36; H01M 50/291; H01M 50/209
See application file for complete search history.

(56) References Cited

U.S. PATENT DOCUMENTS

| | | | |
|---|---|---|---|
| 2015/0333359 A1* | 11/2015 | Takahashi | H01M 50/463 429/127 |
| 2016/0218327 A1* | 7/2016 | Takahashi | H01M 50/124 |
| 2021/0013496 A1 | 1/2021 | Tsuzuki et al. | |

FOREIGN PATENT DOCUMENTS

| | | |
|---|---|---|
| JP | 2018-049793 A | 3/2018 |
| JP | 6587105 B2 | 10/2019 |
| WO | 2019/187537 A1 | 10/2019 |

* cited by examiner

*Primary Examiner* — Kenneth J Douyette
(74) *Attorney, Agent, or Firm* — WHDA, LLP

(57) ABSTRACT

An advantage of the present invention is to suppress an increase in resistance during high-rate charge and discharge and a reduction in capacity during a charge and discharge cycle. An electrical storage module of the present embodiment includes: an electrical storage device, and an elastic body that is placed with the electrical storage device and receives a load from the electrical storage device in a placement direction. The electrical storage device includes a positive electrode, a negative electrode, and a separator. The negative electrode includes a negative-electrode active material layer. The negative-electrode active material layer includes a first layer formed on the negative-electrode current collector, and a second layer that is formed on the first layer and has a higher compression modulus than the first layer. The separator has a lower compression modulus than the first layer, and the elastic body has a lower compression modulus than the separator.

10 Claims, 7 Drawing Sheets

(51) Int. Cl.
  *H01M 4/36*     (2006.01)
  *H01M 4/58*     (2010.01)
  *H01M 10/0525*  (2010.01)
  *H01M 4/587*    (2010.01)
  *H01M 10/0585*  (2010.01)
  *H01M 4/133*    (2010.01)
  H01M 4/02       (2006.01)

(52) U.S. Cl.
  CPC ....... *H01M 4/587* (2013.01); *H01M 10/0525* (2013.01); *H01M 10/0585* (2013.01); *H01M 50/209* (2021.01); *H01M 2004/021* (2013.01); *H01M 2004/027* (2013.01)

ELECTRICAL STORAGE DEVICE AND ELECTRICAL STORAGE MODULE

CROSS REFERENCE TO RELATED APPLICATION

The entire disclosure of Japanese Patent Application No. 2020-004990 filed on Jan. 16, 2020 including the specification, claims, drawings, and abstract is incorporated herein by reference in its entirety.

TECHNICAL FIELD

The present disclosure generally relates to a technique of an electrical storage device and to an electrical storage module.

BACKGROUND

An electrical storage device, e.g., a lithium-ion secondary battery, is typically provided with an electrode body in which a positive electrode including a positive-electrode active material layer and a negative electrode including a negative-electrode active material layer are stacked with a separator interposed therebetween, and an electrolytic solution. Such an electrical storage device is, for example, a battery that is charged and discharged by charge carriers (e.g., lithium ions) moving between electrodes in an electrolytic solution. During the charge of the electrical storage device, charge carriers are released from the positive-electrode active material constituting the positive-electrode active material layer and are occluded into the negative-electrode active material constituting the negative-material active material layer. During the discharge, conversely, charge carriers are released from the negative-electrode active material and are occluded into the positive-electrode active material. In this way, when charge carriers are occluded and released into and from the active materials during the charge and discharge of the electrical storage device, the electrode body expands and contracts.

If the expansion and contraction of the electrode body in response to the charge and discharge of the electrical storage device presses an electrolytic solution stored in the electrode body out of the electrode body, unfortunately, a battery resistance may increase during high-rate charge and discharge.

For example, JP 6587105 B proposes a secondary battery in which a negative electrode has a higher compression modulus than a separator. Furthermore, Patent Document 1 discloses that a negative electrode has a higher compression modulus than a separator and thus the retainability of an electrolytic solution in an electrode body is improved and an increase in battery resistance is suppressed particularly when charge and discharge are repeated at a high rate.

SUMMARY

Technical Problem

Since electrical storage devices tend to decrease in capacity through repetition of charge and discharge, it is important to suppress a reduction in capacity during a charge and discharge cycle in order to extend the lives of the electrical storage devices.

It is an advantage of the present disclosure to provide an electrical storage device and an electrical storage module that suppress an increase in resistance during high-rate charge and discharge and a reduction in capacity during a charge and discharge cycle.

Solution to Problem

An electrical storage device according to an aspect of the present disclosure is an electrical storage device including an electrode body in which a positive electrode, a negative electrode, and a separator disposed between the positive electrode and the negative electrode are stacked, an elastic body configured to receive a load from the electrode body in the stacking direction of the electrode body, and a housing accommodating the electrode body and the elastic body, wherein the negative electrode includes a negative-electrode current collector, and a negative-electrode active material layer that is formed on the negative-electrode current collector and contains negative-electrode active material particles, the negative-electrode active material layer includes a first layer formed on the negative-electrode current collector, and a second layer that is formed on the first layer and has a higher compression modulus than the first layer, the separator has a lower compression modulus than the first layer, and the elastic body has a lower compression modulus than the separator.

An electrical storage module according to an aspect of the present disclosure is an electrical storage module including at least one electrical storage device, and an elastic body that is placed with the electrical storage device and receives a load from the electrical storage device in the placement direction of the elastic body, wherein the electrical storage device includes an electrode body in which a positive electrode, a negative electrode, and a separator disposed between the positive electrode and the negative electrode are stacked, and a housing accommodating the electrode body, the negative electrode includes a negative-electrode current collector, and a negative-electrode active material layer that is formed on the negative-electrode current collector and contains negative-electrode active material particles, the negative-electrode active material layer including a first layer formed on the negative-electrode current collector, and a second layer that is formed on the first layer and has a higher compression modulus than the first layer, the separator has a lower compression modulus than the first layer, and the elastic body has a lower compression modulus than the separator.

Advantageous Effect of Invention

An aspect of the present disclosure can suppress an increase in resistance during high-rate charge and discharge and a reduction in capacity during a charge and discharge cycle.

BRIEF DESCRIPTION OF DRAWINGS

Embodiment(s) of the present disclosure will be described based on the following figures, wherein.

DESCRIPTION OF EMBODIMENT

Figure 1:
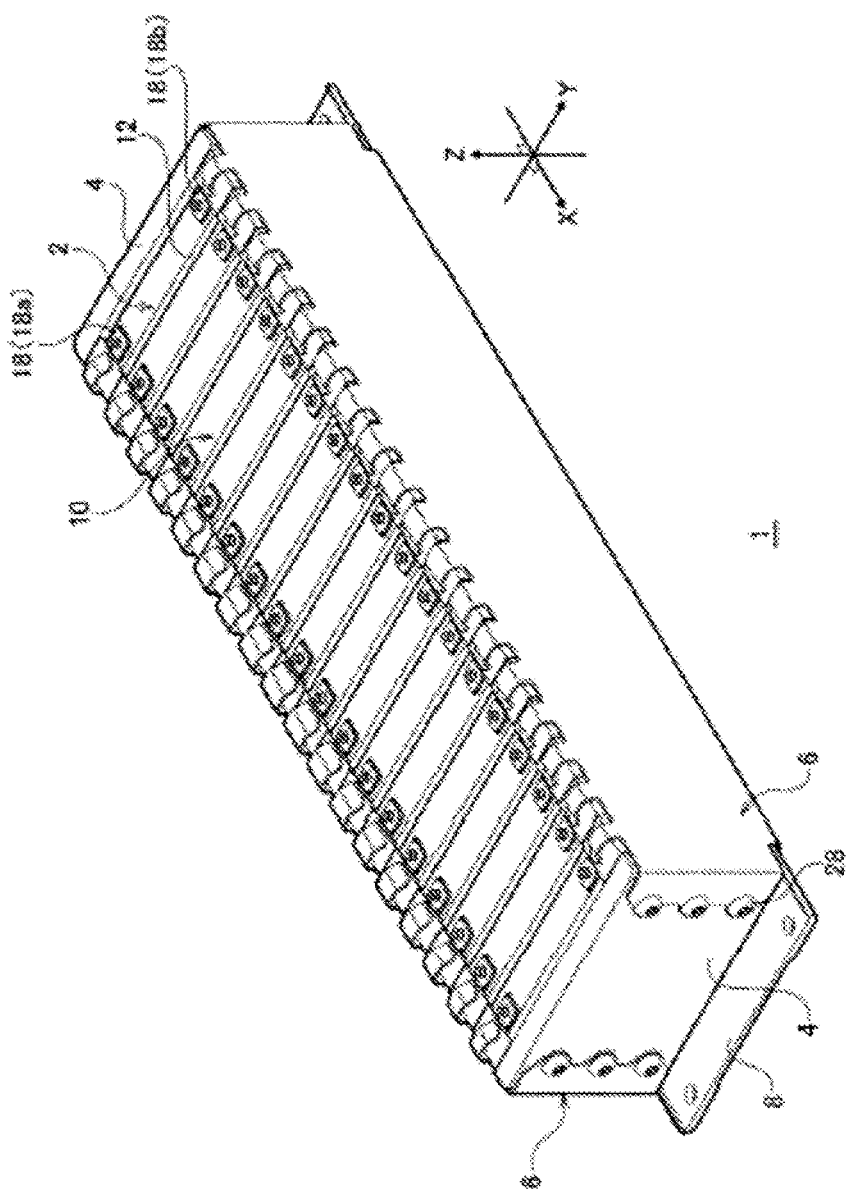
FIG. 1 is a perspective view illustrating an electrical storage module according to an embodiment.

An example of an embodiment will be specifically described below. Drawings to be referred in the description of the embodiment are schematically illustrated and thus the dimensional ratios or the like of constituent elements illustrated in the drawings may be different from those of an actual configuration.

Figure 2:
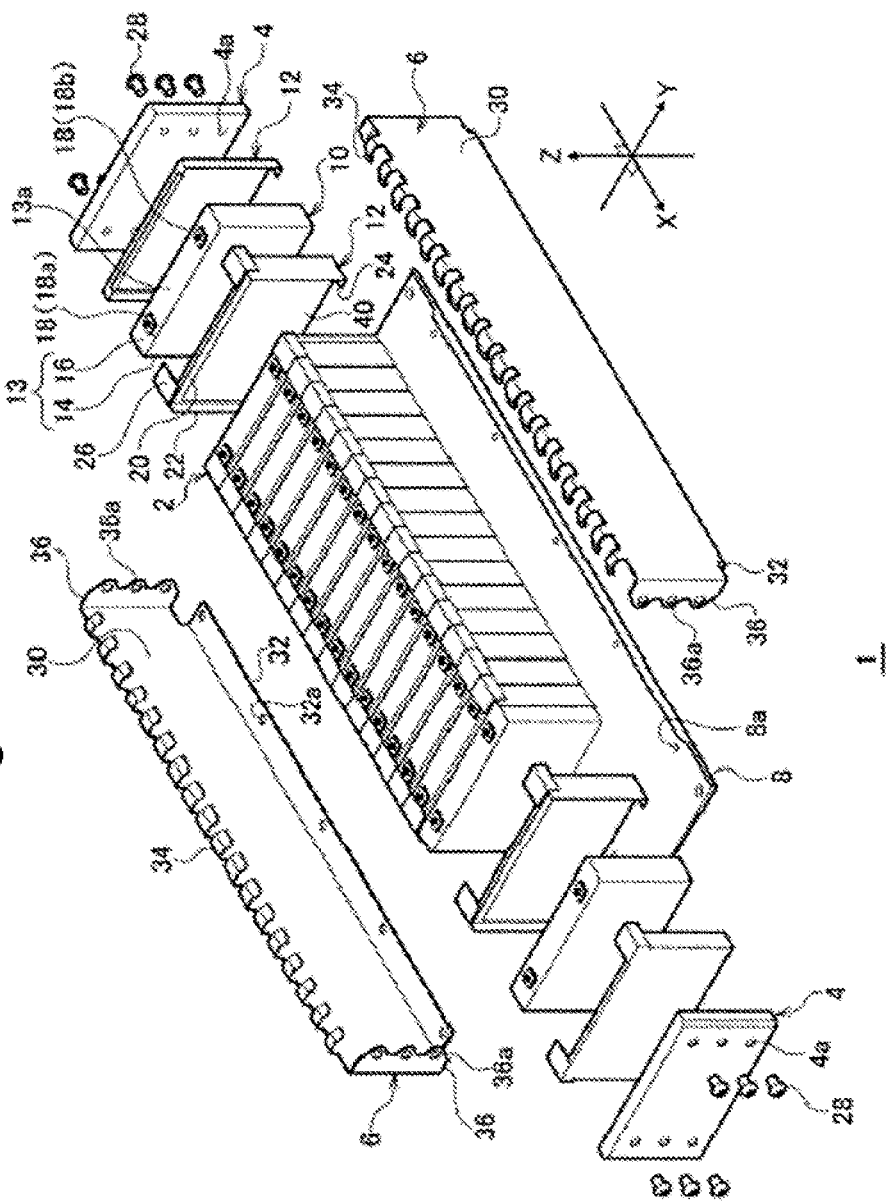
FIG. 2 is an exploded perspective view illustrating the electrical storage module according to the embodiment.

FIG. 1 is a perspective view illustrating an electrical storage module according to the embodiment. FIG. 2 is an exploded perspective view illustrating the electrical storage module according to the embodiment. An electrical storage module 1 includes, for example, an electrical storage stack 2, a pair of locking members 6, and a cooling plate 8. The electrical storage stack 2 includes a plurality of electrical storage devices 10, a plurality of insulating spacers 12, a plurality of elastic bodies 40, and a pair of end plates 4.

The electrical storage devices 10 are secondary batteries that can be charged and discharged, such as lithium-ion secondary batteries, nickel-metal hydride secondary batteries, or nickel-cadmium secondary batteries. The electrical storage device 10 of the present embodiment is a so-called rectangular battery including an electrode body 38 (see FIG. 3), an electrolytic solution, and a housing 13 shaped like a flat rectangular prism. The housing 13 includes an outer can 14 and a sealing plate 16. The outer can 14 has a substantially rectangular opening on one surface. The electrode body 38 and an electrolytic solution or the like are stored in the outer can 14 through the opening. The outer can 14 is desirably coated with an insulating film. e.g., a shrink tube, which is not illustrated. The sealing plate 16 for closing the opening and sealing the outer can 14 is provided on the opening of the outer can 14. The sealing plate 16 constitutes a first surface 13a of the housing 13. The sealing plate 16 and the outer can 14 are joined to each other by, for example, laser, friction stir welding, or brazing and soldering.

The housing 13 may be, for example, a cylindrical case or an exterior part composed of a laminated sheet including a metallic layer and a resin layer.

Figure 3:
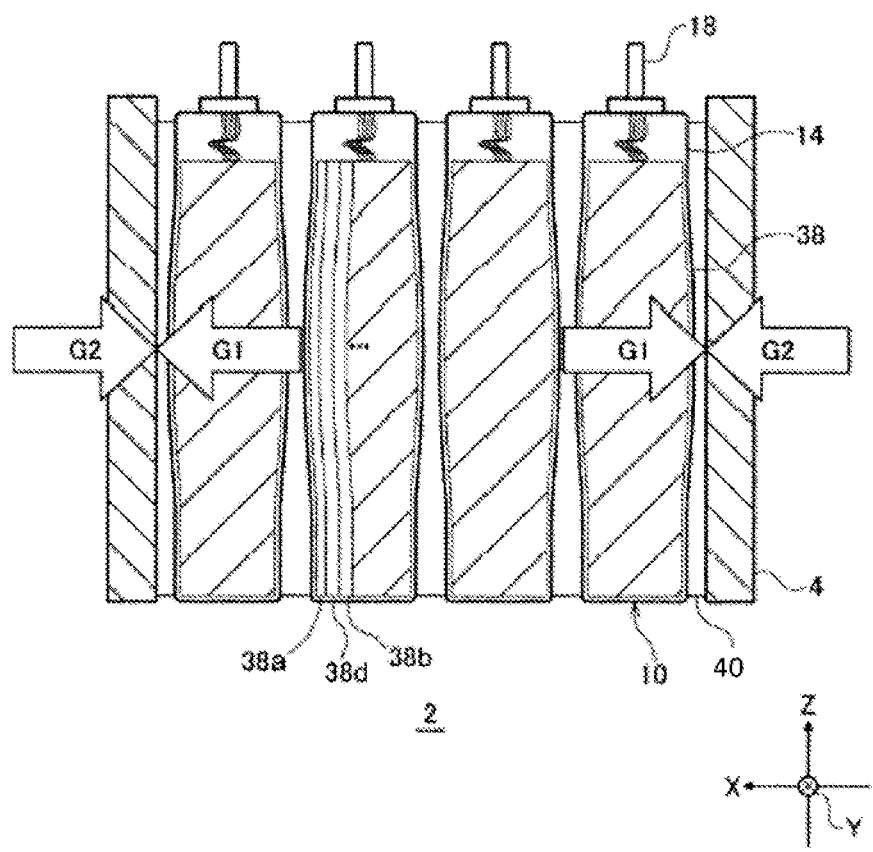
FIG. 3 is a schematic cross-sectional view of expanding electrical storage devices.

The electrode body 38 is configured such that a plurality of sheet positive electrodes 38a and a plurality of sheet negative electrodes 38b are alternately stacked with separators 38d, which are interposed between the respective positive electrodes 38a and negative electrodes 38b(see FIG. 3). The positive electrodes 38a, the negative electrodes 38b, and the separators 38d are stacked in a first direction X. In other words, the first direction X is the stacking direction of the electrode bodies 38. Moreover, the electrodes on both ends in the stacking direction face the long lateral faces of the housing 13. The long lateral faces will be described later. The first direction X, a second direction Y, and a third direction Z in the drawings are orthogonal to one another.

The electrode body 38 may be an electrode body of a cylindrical winding type, in which a strip positive electrode and a strip negative electrode are stacked with a separator interposed therebetween, or an electrode body of a flat winding type that is formed by flattening an electrode body of a cylindrical winding type. For an electrode body of the flat winding type, an outer can shaped like a rectangular prism may be used. For an electrode body of the cylindrical winding type, a cylindrical outer can is used.

On the sealing plate 16; that is, on the first surface 13a of the housing 13, an output terminal 18 is provided on one end in the longitudinal direction while being electrically connected to the positive electrode 38a of the electrode body 38, and an output terminal 18 is provided on the other end while being electrically connected to the negative electrode 38b of the electrode body 38. Hereinafter, the output terminal 18 connected to the positive electrode 38a will be referred to as a positive terminal 18a, and the output terminal 18 connected to the negative electrode 38b will be referred to as a negative terminal 18b. When it is not necessary to discriminate between the polarities of the pair of the output terminals 18, the positive terminal 18a and the negative terminal 18b are collectively referred to as the output terminals 18.

The outer can 14 has a bottom opposed to the sealing plate 16. The outer can 14 also has four lateral faces connecting the opening and the bottom. Two of the four lateral faces are a pair of long lateral faces connected to two opposed long sides of the opening. The long lateral faces are surfaces having the largest area among the faces of the outer can 14; that is, main surfaces. Moreover, the long lateral faces are lateral faces extending in a direction crossing (for example, orthogonal to) the first direction X. Two lateral faces other than the two long lateral faces are a pair of short lateral faces connected to the opening and the short sides of the bottom of the outer can 14. The bottom, long lateral faces, and short lateral faces of the outer can 14 correspond respectively to the bottom, long lateral faces, and short lateral faces of the housing 13.

In the description of the present embodiment, for convenience, the first surface 13a of the housing 13 is illustrated as the top surface of the electrical storage device 10. Furthermore, the bottom of the housing 13 corresponds to the bottom of the electrical storage device 10, the long lateral faces of the housing 13 correspond to the long lateral faces of the electrical storage device 10, and the short lateral faces of the housing 13 correspond to the short lateral faces of the electrical storage device 10. The electrical storage module 1 has a top surface near the top surfaces of the electrical storage devices 10, a bottom surface near the bottoms of the electrical storage devices 10, and lateral faces near the short lateral faces of the electrical storage devices 10. Moreover, the top surface of the electrical storage module 1 is located on the upper side in a vertical direction and the bottom of the electrical storage module 1 is located on the lower side in the vertical direction.

The electrical storage devices 10 are provided in parallel at predetermined intervals such that the long lateral faces of the adjacent electrical storage devices 10 are opposed to each other. Furthermore, in the present embodiment, the output terminals 18 of the electrical storage devices 10 are oriented in the same direction. The output terminals 18 may be oriented in different directions.

Two adjacent electrical storage devices 10 are arranged (placed) such that the positive terminal 18a of one of the electrical storage devices 10 and the negative terminal 18b of the other electrical storage device 10 are adjacent to each other. The positive terminal 18a and the negative terminal 18b are connected in series via a bus bar (not illustrated). Alternatively, the output terminals 18 with the same polarity on the adjacent electrical storage devices 10 may be connected in parallel via a bus bar so as to form electricalstorage-device blocks, and the electrical-storage-device blocks may be connected in series.

The insulating spacer 12 is disposed between two adjacent electrical storage devices 10 and provides electrical insulation between the two electrical storage devices 10. The insulating spacer 12 is made of, for example, insulating resin. The insulating spacer 12 is made of resins including, for example, polypropylene, polybutylene terephthalate, and polycarbonate. The electrical storage devices 10 and the insulating spacers 12 are alternately placed. The insulating spacer 12 is also disposed between the electrical storage device 10 and the end plate 4.

The insulating spacer 12 has a flat part 20 and a wall part 22. The flat part 20 is interposed between the opposed long lateral faces of the two adjacent electrical storage devices 10. This ensures insulation between the outer cans 14 of the adjacent electrical storage devices 10.

The wall part 22 extends from the outer edge of the flat part 20 in the direction of arranging the electrical storage devices 10 and covers a part of the top surface, the lateral face, and a part of the bottom of the electrical storage device 10. This can, for example, obtain a lateral-face distance between the adjacent electrical storage devices 10 or between the electrical storage device 10 and the end plate 4. The wall part 22 has a notch 24 where the bottom of the electrical storage device 10 is exposed. The insulating spacer 12 has urge receiving portions 26 that are placed face up at each end of the insulating spacer 12 in the second direction Y.

The elastic bodies 40 are placed with the electrical storage devices 10 along the first direction X. In other words, the first direction X is, as described above, the stacking direction of the electrode bodies 38 and is also the placement direction of the electrical storage devices 10 and the elastic bodies 40. The elastic body 40 is a sheet member disposed between the long lateral face of the electrical storage device 10 and the flat part 20 of the insulating spacer 12, for example. The elastic body 40 disposed between two adjacent electrical storage devices 10 may be a sheet or a stack of a plurality of stacked sheets. The elastic body 40 may be fixed to the surface of the flat part 20 with adhesive or the like. Alternatively, the flat part 20 may have a recessed portion and the elastic body 40 may be fit into the recessed portion. Furthermore, the elastic body 40 and the insulating spacer 12 may be molded in one piece. Moreover, the elastic body 40 may be used as the flat part 20. The structure and effects of the elastic body 40 will be specifically discussed later.

The electrical storage devices 10, the insulating spacers 12, and the elastic bodies 40 that are provided in parallel are sandwiched between the pair of end plates 4 in the first direction X. The end plate 4 includes, for example, a metallic plate or a resin plate. The end plate 4 has screw holes 4a that penetrate the end plate 4 in the first direction X and into which screws 28 are to be inserted.

The pair of locking members 6 are long members that are longitudinally extended in the first direction X. The pair of locking members 6 are opposed to each other in the second direction Y. The electrical storage stack 2 is disposed between the pair of locking members 6. The locking member 6 includes a body portion 30, a support portion 32, a plurality of urging portions 34, and a pair of fixing portions 36.

The body portion 30 is a rectangular portion extending in the first direction X. The body portion 30 extends in parallel with the lateral faces of the electrical storage devices 10. The support portion 32 extends in the first direction X and protrudes from the lower end of the body portion 30 in the second direction Y. The support portion 32 is a continuous plate member that extends in the first direction X and supports the electrical storage stack 2.

The urging portions 34 are connected to the upper end of the body portion 30 and protrude in the second direction Y. The support portion 32 and the urging portions 34 are opposed to each other in the third direction Z. The urging portions 34 are placed at predetermined intervals in the first direction X. The urging portions 34 are shaped like, for example, leaf springs and urge the electrical storage devices 10 to the support portion 32.

The pair of fixing portions 36 are plate members that protrude in the second direction Y from both ends of the body portion 30 in the first direction X. The pair of fixing portions 36 are opposed to each other in the first direction X. The fixing portion 36 has through holes 36a where the screws 28 are inserted. The pair of fixing portions 36 fixes the locking members 6 to the electrical storage stack 2.

The cooling plate 8 is a mechanism for cooling the electrical storage devices 10. The electrical storage stack 2 locked by the pair of locking members 6 is placed on the major surface of the cooling plate 8 and is fixed to the cooling plate 8 by inserting fastening members (not illustrated) such as screws into through holes 32a of the support portion 32 and through holes 8a of the cooling plate 8.

FIG. 3 is a schematic cross-sectional view of the expanding electrical storage devices. The number of electrical storage devices 10 is reduced in the illustration of FIG. 3. Moreover, the illustration of the internal structures of the electrical storage devices 10 is simplified and the insulating spacers 12 are omitted. As illustrated in FIG. 3, the electrode body 38 (the positive electrodes 38a, the negative electrodes 38b, the separators 38d) is stored in each of the electrical storage devices 10. The outer can 14 of the electrical storage device 10 expands and contracts according to the expansion and contraction of the electrode body 38 during charge and discharge. The expansion of the outer can 14 of the electrical storage device 10 generates a load G1 that is applied outward in the first direction X in the electrical storage stack 2. In other words, the elastic bodies 40 placed with the electrical storage devices 10 receive loads from the electrical storage devices 10 in the first direction X (the placement direction of the electrical storage devices 10 and the elastic bodies 40). To the electrical storage stack 2, a load G2 corresponding to the load G1 is applied by the locking member 6.

The compression moduli of the negative electrode 38b, the separator 38d, and the elastic body 40 will be described below.

Figure 4:
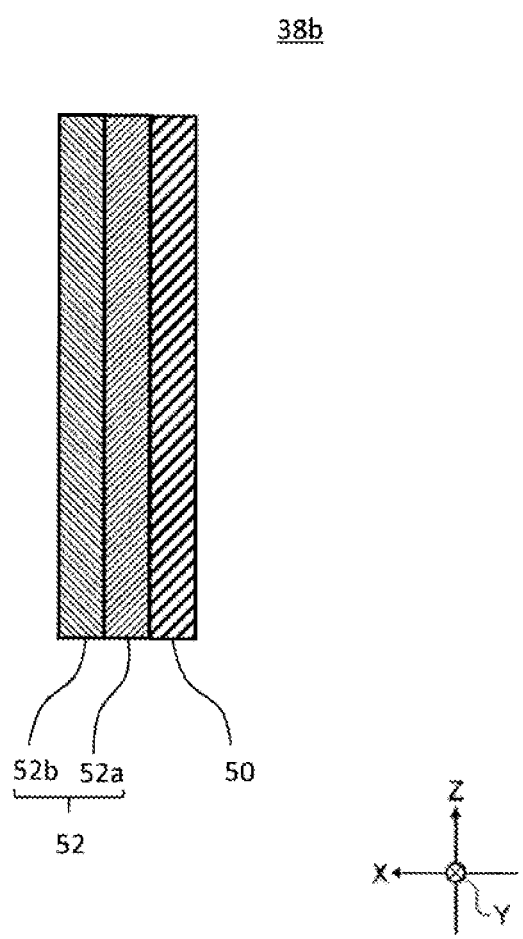
FIG. 4 is a schematic cross-sectional view of a negative electrode.

FIG. 4 is a schematic cross-sectional view of the negative electrode. As illustrated in FIG. 4, the negative electrode 38b includes a negative-electrode current collector 50 and a negative-electrode active material layer 52 that is disposed on the negative-electrode current collector 50 and contains negative-electrode active material particles. The negative-electrode active material layer 52 includes a first layer 52a formed on the negative-electrode current collector 50, and a second layer 52b formed on the first layer 52a. The second layer 52b has a higher compression modulus than the first layer 52a. In other words, the negative-electrode active material layer 52 has a high compression modulus near the surface and has a low compression modulus near the negative-electrode current collector. Furthermore, the separator 38d has a lower compression modulus than the first layer 52a. The elastic body 40 has a lower compression modulus than the separator 38d. In other words, the compression modulus decreases in the order of the second layer 52b near the surface>the first layer 52a near the negative-electrode current collector>the separator 38d>the elastic body 40. Thus, in this configuration, the second layer 52b near the surface is the most resistant to deformation and the elastic body 40 is the most deformable. As described above, the present embodiment specifies the compression moduli of the members, thereby suppressing an increase in resistance during high-rate charge and discharge and a reduction in capacity during a charge and discharge cycle. This mechanism is not sufficiently identified but is assumed to be configured as follows:

Typically, the electrode body 38 expands and contracts in response to the charge and discharge of the electrical storage device 10, thereby pressing an electrolytic solution in the electrode body 38 out of the electrode body 38. In the present embodiment, however, the second layer 52b near the surface of the negative-electrode active material layer 52 has a high compression modulus, thereby suppressing the expansion and contraction of the second layer 52b when the electrical storage device 10 is charged or discharged. Furthermore, the compression modulus of the second layer 52b is absorbed by the first layer 52a having a lower compression modulus than the second layer 52b (in other words, the first layer 52a is more deformable than the second layer 52b). Moreover, the expansion and contraction of the first layer 52a on the current-collector side of the negative-electrode active material layer 52 are absorbed by the separator 38d having a lower compression modulus than the first layer 52a (in other words, the separator 38d is more deformable than the first layer 52a). This effect suppresses the pressing of an electrolytic solution out of the negative-electrode active material layer 52 when the electrical storage device 10 is charged or discharged. Furthermore, a stress applied to the separator 38d by the expansion and contraction of the negative-electrode active material layer 52 is absorbed by the elastic body 40 having a lower compression modulus than the separator 38d. This suppresses deformation of the separator 38d and improves the retainability of an electrolytic solution in the electrode body 38. Hence, an increase in resistance is suppressed during high-rate charge and discharge. In the negative-electrode active material layer 52, the first layer 52a near the negative-electrode current collector is more deformable than the second layer 52b near the surface. This increases a contact area and adhesion with the negative-electrode current collector 50 and suppresses disconnection of a conductive path from the negative-electrode current collector 50, thereby suppressing a reduction in capacity in a charge and discharge cycle.

A compression modulus is calculated by dividing, when a predetermined load is applied to a sample in the thickness direction, the deformation amount of the sample in the thickness direction by a compression area and then multiplying the deformation amount by the thickness of the sample as expressed by the following formula: Compression modulus (MPa)=load (N)/compression area (mm$^2$)/sample deformation amount (mm) x sample thickness (mm). In the measurement of the compression modulus of the negative-electrode active material layer 52, the compression modulus of the negative-electrode current collector 50 is measured, the compression modulus of sample 1 in which the first layer 52a is formed on the negative-electrode current collector 50 is measured, and the compression modulus of sample 2 in which the second layer 52b is formed on the first layer 52a on the negative-electrode current collector 50 is measured. Based on the compression moduli of the negative-electrode current collector 50 and sample 1, the compression modulus of the first layer 52a is calculated. Based on the compression moduli of sample 1 and sample 2, the compression modulus of the second layer 52b is calculated. When the compression moduli of the first layer 52a and the second layer 52b are determined from the produced negative electrode 38b, the compression modulus of the negative electrode 38b is measured, the compression modulus of sample 1 in which the second layer 52b is removed from the negative electrode is measured, and then the compression modulus of the negative-electrode current collector 50 is measured. Based on the measured compression moduli, the compression moduli of the first layer 52a and the second layer 52b can be determined.

Figure 5:
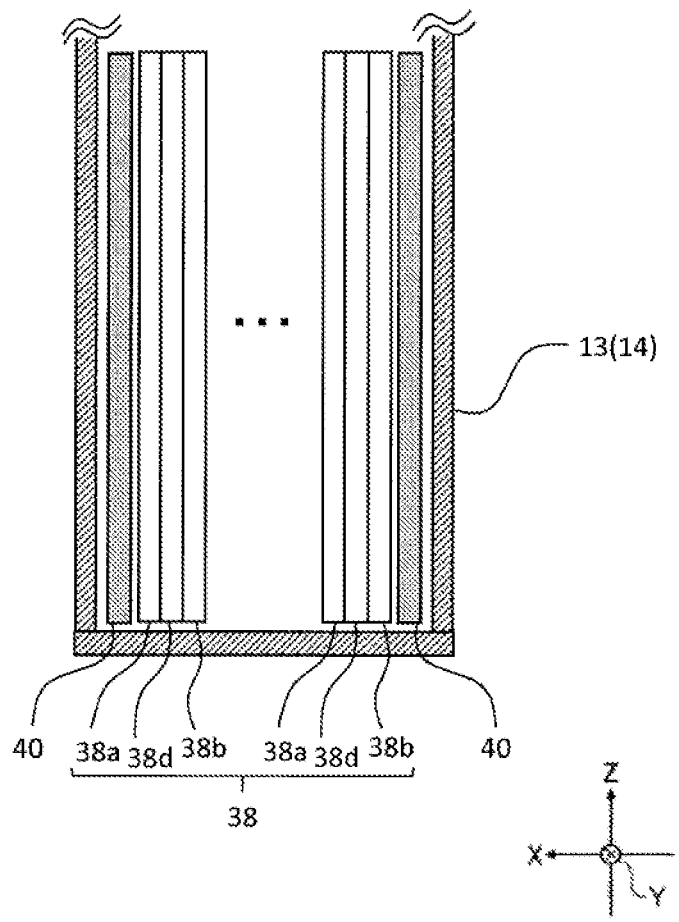
FIG. 5 is a schematic cross-sectional view of elastic bodies disposed in a housing.

FIG. 5 is a schematic cross-sectional view of the elastic bodies disposed in the housing. When the elastic bodies 40 are placed with the electrical storage devices 10 as described above, the elastic bodies 40 are not always placed outside the housing 13. The elastic bodies 40 may be placed inside the housing 13. The elastic bodies 40 in FIG. 5 are disposed on both ends of the electrode body 38 in the stacking direction (first direction X) of the electrode bodies 38. The elastic body 40 is interposed between the inner wall of the housing 13 and the electrode body 38.

When the electrode body 38 is expanded by, for example, the charge and discharge of the electrical storage device 10, a load applied outward in the first direction X is generated in the electrode body 38. In other words, the elastic bodies 40 placed in the housing 13 receive a load from the electrode body 38 in the first direction X (the stacking direction of the electrode body). The same effect can be obtained if the compression modulus satisfies the relationship of the first layer 52a>the second layer 52b>the separator 38d>the elastic body 40.

Figure 6:
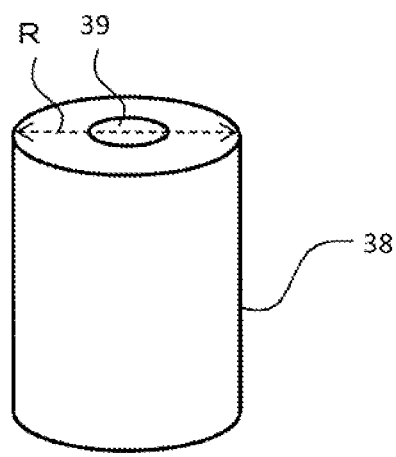
FIG. 6 is a schematic perspective view illustrating an electrode body of a cylindrical winding type.

The elastic bodies 40 in the housing 13 may be placed at any positions so long as a load can be received from the electrode body 38 in the stacking direction of the electrode body 38. For example, the elastic body 40 may be placed in a winding core 39 of the electrode body 38 of the cylindrical winding type illustrated in FIG. 6. The stacking direction of the electrode body 38 of the cylindrical winding type is a radial direction (R) of the electrode body 38. As the electrode body 38 expands or contracts, a load is generated in the electrode body 38 in the stacking direction (the radial direction (R) of the electrode body 38) of the electrode body 38, and the elastic body 40 in the winding core 39 receives the load in the stacking direction of the electrode body 38. If the multiple electrode bodies 38 are placed in the housing 13, which is not illustrated, the elastic body 40 may be disposed between the adjacent electrode bodies 38. Also in the case of the flat winding type, the electrode body may be placed at the center of the electrode body.

The negative electrode 38b can be produced by using, for example, a first negative-electrode mixture slurry containing negative-electrode active material particles P1 and a binder, and a second negative-electrode mixture slurry containing negative-electrode active material particles P2 and a binder. Specifically, the surface of the negative-electrode current collector 50 is coated with the first negative-electrode mixture slurry, and the coating is dried. Thereafter, the second negative-electrode mixture slurry is applied onto a first coating formed by the first negative-electrode mixture shiny, and a second coating is dried, thereby obtaining the negative electrode 38b in which the negative-electrode active material layer 52 including the first layer 52a and the second layer 52b is formed on the negative-electrode current collector 50. A method of adjusting the compression moduli of the first layer 52a and the second layer 52b is, for example, a method of rolling the formed first coating and the formed second coating and adjusting the roll forces of the coatings. Alternatively, the compression moduli can be also adjusted by changing, for example, the material properties and physical properties of negative-electrode active materials used for the first layer 52a and the second layer 52b. The adjustment of compression moduli of the layers is not limited to the foregoing adjustment.

The negative-electrode active material particles P2 contained in the second layer 52b preferably have a smaller BET specific surface area than the negative-electrode active material particles P1 contained in the first layer 52a. This facilitates the formation of the negative-electrode active material layer 52 in which the second layer 52b has a higher compression modulus than the first layer 52a. The negative-electrode active material particles P2 preferably have a BET specific surface area of, for example, 0.5 $m^2/g$ to smaller than 3.5 $m^2/g$ and more preferably have a BET specific surface area of, for example, 0.75 $m^2/g$ to 1.9 $m^2/g$. The negative-electrode active material particles P1 preferably have a BET specific surface area of, for example, 3.5 $m^2/g$ to 5 $m^2/g$ and more preferably have a BET specific surface area of, for example, 2.5 $m^2/g$ to 4.5 $m^2/g$. A BET specific surface area is measured by using a conventionally known specific-surface-area measuring device (e.g., Macsorb (registered trademark) HM model-1201 by Mountech Co. Ltd.) according to the BET method.

Any negative-electrode active material particles may be selected according to the type of the electrical storage device 10. For example, in the case of lithium-ion secondary batteries, materials capable of reversibly occluding and releasing lithium ions may be used. Specifically, the materials may be carbon materials such as natural graphite, artificial graphite, non-graphitizable carbon, and graphitizable carbon, surface-modified carbon materials that are carbon materials covered with amorphous carbon films, metals alloyed with lithium, e.g., silicon (Si) and tin (Sn), or alloys or composite oxides containing metallic elements such as Si and Sn. At least one of the materials may be used alone or in combination. The negative-electrode active material particles P2 contained in the second layer 52b contain the surface-modified carbon materials. An amorphous carbon film preferably accounts for at least 1.5 mass % relative to a surface-modified carbon material. Thus, the second layer 52b is easily formed with a high compression modulus. The negative-electrode active material particles P1 contained in the first layer 52a contain the surface-modified carbon materials. The content of an amorphous carbon film is preferably lower than 1.5 mass % relative to a surface-modified carbon material. Thus, the first layer 52a is easily formed with a low compression modulus.

The negative-electrode active material particles P1 contained in the first layer 52a preferably have pores therein with a porosity rate of 10% or more. Thus, the first layer 52a is easily formed with a low compression modulus. The negative-electrode active material particles P2 contained in the second layer 52b preferably have pores therein with a porosity rate of less than 10%. Thus, the second layer 52b is easily formed with a high compression modulus.

The second layer 52b preferably has a higher porosity rate than the first layer 52a. This may increase the penetration of an electrolytic solution into the negative-electrode active material layer 52 and contribute to, for example, suppression of an increase in resistance during high-rate charge and discharge or suppression of a reduction in capacity in a charge and discharge cycle.

In this case, a particle-internal porosity rate for the negative-electrode active material particles P1 and P2 is a two-dimensional value determined from the area ratio of the internal pores of the negative-electrode active material particles relative to the cross-sectional area of the negative-electrode active material particles. The porosity rates of the first layer 52a and the second layer 52b are two-dimensional values, each being determined from the area ratio of pores between particles in each layer relative to the cross-sectional area of each layer. For example, the porosity rates are determined by the following steps:

(1) The negative electrode is partially cut, and then the negative electrode is processed by an ion milling device (e.g., IM4000 by Hitachi High-Tech Corporation) so as to expose the cross section of the negative-electrode active material layer 52.

(2) A reflection electron image of the cross section of the first layer 52a in the exposed negative-electrode active material layer 52 is captured by using a scanning electron microscope.

(3) The cross-sectional image thus obtained is captured by a computer and is binarized using image analysis software (e.g., ImageJ by the National Institutes of Health), obtaining a binary image in which the cross sections of particles in the cross-sectional image are black and pores between particles and pores in particles are white.

(4-1) When the particle-internal porosity rate of the negative-electrode active material particles P1 is determined, particles having a particle size of 5 μm to 50 μm are selected from the binary image, and then the area of the cross sections of the particles and the area of internal pores in the cross sections of the particles are calculated. In this case, the area of the cross sections of the particles means the area of regions surrounded by the outer edges of the particles; that is, the area of all the cross sections of the particles. From the calculated area of the cross sections of the particles and the calculated area of internal pores in the cross sections of the particles, a particle-internal porosity rate (the area of internal pores in the cross sections of the particles× 100/the area of the cross sections of the particles) is calculated. The particle-internal porosity rate is the mean value of ten particles.

(4-2) When the porosity rate of the first layer 52a is determined, the area of pores between particles in a measurement range (50 μm×50 μm) is calculated from a binary image. The cross-sectional area (2500 $μm^2$=50 μm×50 μm) of the first layer 52a is set as the measurement range, and the porosity rate of the first layer 52a (the area of pores between particles×100/the cross-sectional area of the negative-electrode active material layer 52) is calculated from the calculated area of pores between particles.

The particle-internal porosity rate of the negative-electrode active material particles P2 and the porosity rate of the second layer 52b are similarly measured.

A method of adjusting the porosity rates of the first layer 52a and the second layer 52b is, for example, a method of adjusting roll forces applied to the first coating and the second coating during the formation of the negative-electrode active material layer 52. The particle-internal porosity rate of the negative-electrode active material particles is adjusted in the process of manufacturing the negative-electrode active material particles.

The negative-electrode active material particles P2 contained in the second layer 52b are preferably hard particles having a 10% proof stress of 5 MPa or more. The 10% proof stress means a pressure when the negative-electrode active material particles are compressed by a volume ratio of 10%. The 10% proof stress of a negative-electrode active material particle can be measured by using, for example, a micro compression tester (MCT-211 by SHIMADZU CORPORATION). For example, the negative-electrode active material particles P1 contained in the first layer 52a are preferably particles softer than the negative-electrode active material particles P2 and have a 10% proof stress of 3 MPa or less.

The compression modulus of the second layer 52b is preferably at least 1.2 times and more preferably at least twice as high as the compression modulus of the first layer 52b. The satisfaction of the range may suppress, for example, an increase in resistance during high-rate charge and discharge or suppress a reduction in capacity in a charge and discharge cycle.

The negative-electrode active material layer 52 has a thickness of, for example, 40 μm to 120 μm, preferably 50 μm to 90 μm on one side of the negative-electrode current collector 50. The thickness of the negative-electrode active material layer 52 is measured from a cross-sectional image of the negative electrode 38b, the image being captured by a scanning electron microscope (SEM).

For the negative-electrode current collector 50, a metal leaf that is stable in the potential range of the negative electrode 38b or a film having a metallic surface layer is used. For example, materials such as copper are used for lithium-ion secondary batteries.

The positive electrode 38a includes, for example, a positive-electrode current collector, and a positive-electrode active material layer formed on the positive-electrode current collector. For the positive-electrode current collector, a metal leaf that is stable in the potential range of the positive electrode or a film having a metallic surface layer is used. For example, materials such as aluminum and an aluminum alloy are used for lithium-ion secondary batteries. The positive-electrode active material preferably contains positive-electrode active material particles, a conductive material, and a binder and is preferably provided on both sides of the positive-electrode current collector. The positive electrode 38a can be produced by, for example, applying to the positive-electrode current collector a coating of positive-electrode mixture shiny containing a positive-electrode active material, a conductive material, and a binder, drying the coating, and then compressing the coating into a positive-electrode active material layer on each side of the positive-electrode current collector.

Any positive-electrode active material may be selected according to the type of the electrical storage device 10. For example, in the case of lithium-ion secondary batteries, a lithium-transition metal composite oxide is used. A lithium-transition metal composite oxide contains metallic elements such as Ni, Co, Mn, Al, B, Mg, Ti, V. Cr, Fe, Cu, Zn, Ga, Sr, Zr, Nb, In, Sn, Ta, and W. From among the metallic elements, at least one of Ni, Co, and Mn is preferably contained. A preferred composite oxide is, for example, a lithium-transition metal composite oxide containing Ni. Co, and Mn, or a lithium-transition metal composite oxide containing Ni, Co, and Al.

The separator 38d is, for example, a porous sheet with ion permeation and insulation. Specific examples of a porous sheet include a microporous thin film, a woven fabric, and a nonwoven fabric. The separator 38d is preferably made of materials including olefin resins such as polyethylene and polypropylene and cellulose. The separator 38d may be a stack including a cellulose fiber layer and a thermoplastic-resin fiber layer containing olefin resin. Alternatively, the separator 38d may be a multilayer separator including a polyethylene layer and a polypropylene layer. The surface of the separator 38d may be coated with materials such as aramid resin and ceramic.

The separator 38d may have any compression modulus lower than that of the first layer 52a of the negative-electrode active material layer 52. For example, the compression modulus is preferably 0.3 to 0.7 times, more preferably 0.4 to 0.6 times the compression modulus of the first layer 52a, in view of effective suppression of an increase in resistance during high-rate charge and discharge or a reduction in capacity during a charge and discharge cycle. The compression modulus of the separator 38d is adjusted by controlling, for example, the selection of materials, a porosity rate, and a pore size.

Any electrolytic solution may be selected according to the type of the electrical storage device 10. For example, in the case of lithium-ion secondary batteries, a nonaqueous electrolytic solution containing a supporting electrolyte in an organic solvent (nonaqueous solvent) is used. The nonaqueous solvent may be a solvent containing, for example, esters, ethers, nitriles, or amides, or a mixed solvent containing at least two kinds of these compounds. The supporting electrolyte is, for example, a lithium salt such as $LiPF_6$.

The materials of the elastic body 40 include, for example, thermosetting elastomers such as natural rubber, polyurethane rubber, silicone rubber, and fluorocarbon rubber, and thermoplastic elastomers such as polystyrene, olefin, urethane, polyester, and polyamide. These materials may be foamed materials. Moreover, a heat insulating material that supports porous materials such as silica xerogel may be used.

The elastic body 40 may have any compression modulus lower than that of the separator 38d. For example, the compression modulus is preferably 120 MPa or less and is more preferably 80 MPa or less, in view of effective suppression of an increase in resistance during high-rate charge and discharge or a reduction in capacity during a charge and discharge cycle.

The elastic body 40 may have a constant compression modulus in one plane but may vary in deformability in the plane as will be described below.

Figure 7:
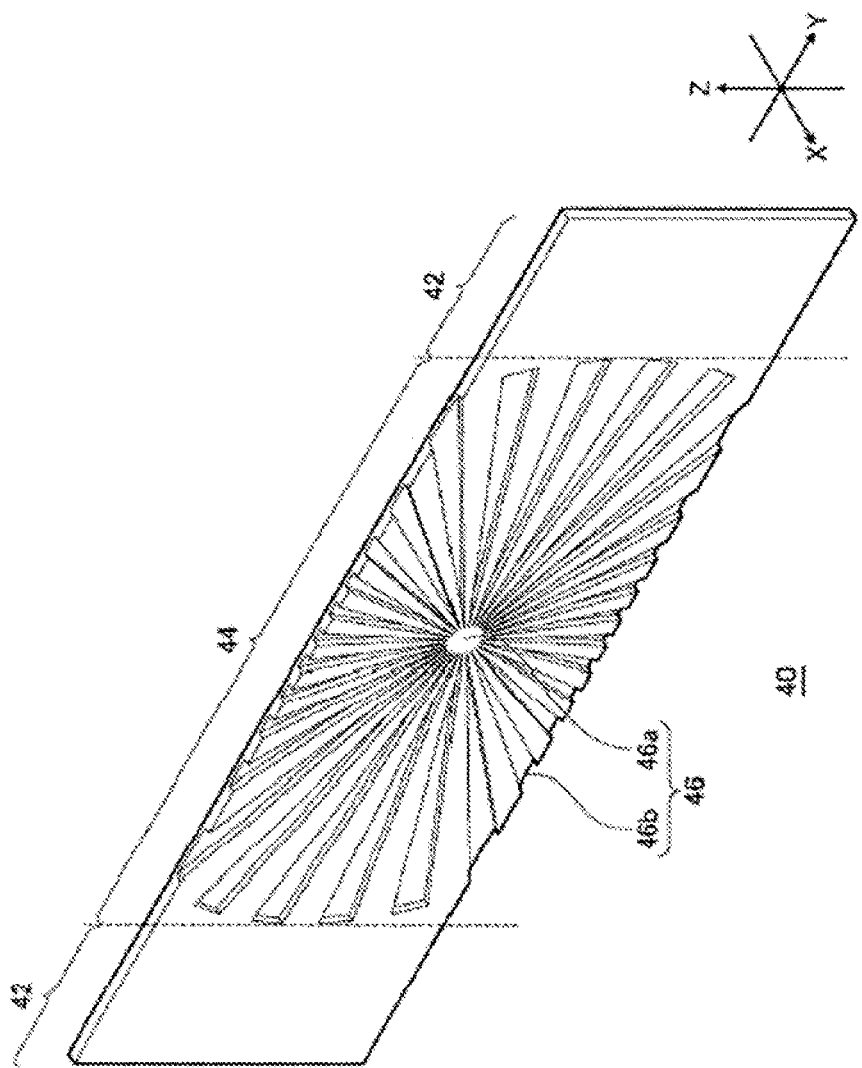
FIG. 7 is a schematic perspective view illustrating an example of the elastic body.

FIG. 7 is a schematic perspective view illustrating an example of the elastic body. The elastic body 40 in FIG. 7 has a soft portion 44 and hard portions 42. The hard portions 42 are placed on the outer edges of the elastic body 40 with respect to the soft portion 44. The elastic body 40 in FIG. 7 has a structure in which the hard portions 42 are disposed on both ends in the second direction Y and the soft portion 44 is disposed between the two hard portions 42. The soft portion 44 is preferably disposed so as to overlap the center of the long lateral faces of the housing 13 and the center of the electrode body 38 in the first direction X. The hard portions 42 are preferably disposed so as to overlap the outer edges of the long lateral faces of the housing 13 and the outer edge of the electrode body 38 in the first direction X.

As described above, the electrical storage device 10 is expanded mainly by the expansion of the electrode body 38. The expansion of the electrode body 38 increases toward the center. Specifically, the displacement of the electrode body 38 increases toward the center in the first direction X and decreases from the center toward the outer edge. According to the displacement of the electrode body 38, the displacement of the electrical storage device 10 increases toward the center of the long lateral face of the housing 13 in the first direction X and decreases from the center toward the outer edge of the long lateral face of the housing 13. Thus, if the elastic body 40 in FIG. 7 is placed in the housing 13, the elastic body 40 can receive, with the soft portion 44, a large load generated by a large displacement of the electrode body 38 and receive, with the hard portions 42, a small load generated by a small displacement of the electrode body 38. If the elastic body 40 in FIG. 7 is placed outside the housing 13, the elastic body 40 can receive, with the soft portion 44, a large load generated by a large displacement of the electrical storage device 10 and receive, with the hard portions 42, a small load generated by a small displacement of the electrical storage device 10.

The elastic body 40 in FIG. 7 has a recessed portion 46 in the first direction X. A non-recessed portion adjacent to the recessed portion 46 can be partially displaced to the recessed portion 46 when receiving a load from the electrical storage device 10 or the electrode body 38. Thus, the provision of the recessed portion 46 can facilitate deformation of the non-recessed portion. In this configuration, in order to make the soft portion 44 more deformable than the hard portions 42, the area ratio of the recessed portion 46 to the area of the soft portion 44 is preferably higher than the area ratio of the recessed portion 46 to the area of the hard portions 42 in the first direction X. On the elastic body 40 in FIG. 7, the recessed portion 46 is disposed only in the soft portion 44. The recessed portion 46 may be disposed in the hard portions 42.

The recessed portion 46 includes a core portion 46a and a plurality of linear portions 46b. The core portion 46a is shaped like a circle disposed at the center of the elastic body 40 in the first direction X. The linear portions 46b are radially extended from the core portion 46a. Since the linear portions 46b are radially extended, the ratio of the linear portions 46b to the non-recessed portions increases toward the core portion 46a and decreases toward the core portion 46a. Thus, the deformability of the non-recessed portions increases near the core portion 46a.

The elastic body 40 may have a plurality of through holes penetrating the elastic body 40 in the first direction X, instead of or along with the recessed portion 46. The through holes are not illustrated. The provision of the through holes can facilitate deformation of non-penetrating portions. Hence, in order to make the soft portion 44 more deformable than the hard portions 42, the area ratio of the through holes to the area of the soft portion 44 is preferably higher than the area ratio of the through holes to the area of the hard portions 42 in the first direction X.

Another example of the elastic body will be described below.

Figure 8:
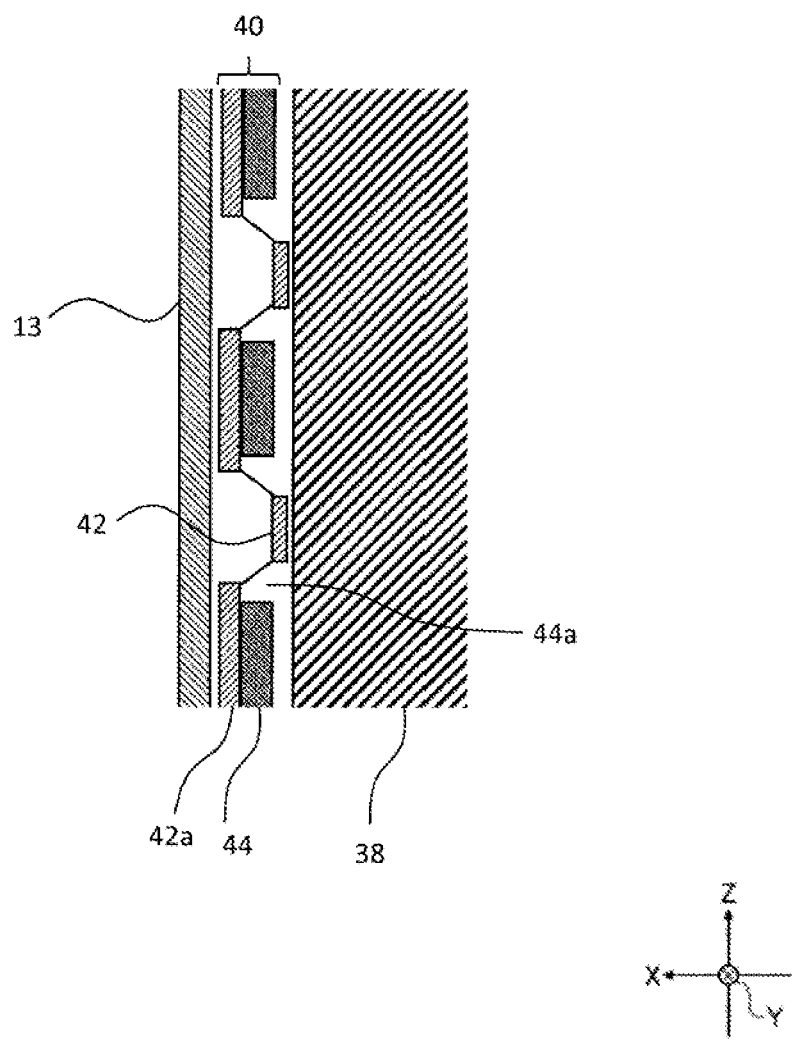
FIG. 8 is a partial schematic cross-sectional view of the elastic body disposed between the electrode body and the housing.

FIG. 8 is a partial schematic cross-sectional view of the elastic body disposed between the electrode body and the housing. The elastic body 40 receives a load from the electrode body 38 in the stacking direction (first direction X) of the electrode body 38. The elastic body 40 includes a substrate 42a where the hard portions 42 having predetermined hardness are formed, and the soft portion 44 that is softer than the hard portion 42. The hard portion 42 is a projecting portion that projects from the substrate 42a toward the electrode body 38 and may be ruptured or plastically deformed by at least a predetermined load. The soft portion 44 is shaped like a sheet disposed between the substrate 42a where the hard portions 42 are formed and the electrode body 38 near the electrode body 38. The soft portion 44 is separated from the electrode body 38. The soft portion 44 has through holes 44a at positions overlapping the hard portions 42 in the first direction X. The hard portion 42 is inserted into the through hole 44a, and the tip of the hard portion 42 projects from the soft portion 44.

In response to a change of the shapes of the hard portions 42, the elastic body 40 shifts from a first state in which a load from the electrode body 38 is received by the hard portions 42 to a second state in which the load is received by the soft portion 44. In other words, in the elastic body 40, a load applied in the stacking direction of the electrode body 38 by the expansion of the electrode body 38 is received by the hard portions 42 (first state). Thereafter, if the amount of expansion of the electrode body 38 increases for some reason so as to apply an excessive load to the hard portions 42, the hard portions 42 are ruptured or plastically deformed, the electrode body 38 comes into contact with the soft portion 44, and the load in the stacking direction of the electrode body 38 is received by the soft portion 44 (second state).

EXAMPLES

The present disclosure will be further described in accordance with examples. The present disclosure is not limited to the examples.

Example 1

[Production of a Positive Electrode]

A lithium-transition metal composite oxide expressed by the general formula $LiNi_{0.82}Co_{0.15}Al_{0.03}O_2$ was used as a positive-electrode active material. The positive-electrode active material, acetylene black, and polyvinylidene fluoride were mixed at a solid mass ratio of 97:2:1, and positive-electrode mixture slurry was prepared by using N-methyl-2-pyrrolidone (NMP) as a dispersion medium. Subsequently, a coating of the positive-electrode mixture slurry was applied to each side of a positive-electrode current collector composed of aluminum foil. The coating was dried, rolled, and then cut into a predetermined electrode size, so that a positive electrode was obtained with a positive-electrode active material layer formed on each side of the positive-electrode current collector.

[Preparation of the First Negative-Electrode Mixture Slurry]

On the surfaces of graphite particles, a surface-modified carbon material A coated with an amorphous carbon film of 0.6 mass % was used as a negative-electrode active material. The surface-modified carbon material A has a BET specific surface area of 3.9 $m^2/g$ (see other physical properties in Table 1). The surface-modified carbon material A, the dispersion of styrene-butadiene rubber (SBR), and sodium carboxymethylcellulose (CMC-Na) were mixed at a solid mass ratio of 100:1:1, and the first negative-electrode mixture slurry was prepared by using water as a dispersion medium.

[Preparation of the Second Negative-Electrode Mixture Slurry]

On the surfaces of graphite particles, a surface-modified carbon material B coated with an amorphous carbon film of 1.5 mass % was used as a negative-electrode active material. The surface-modified carbon material B had a BET specific surface area of 2.9 $m^2/g$ (see other physical properties in Table 1). The surface-modified carbon material B, the dispersion of SBR, and CMC-Na were mixed at a solid mass ratio of 100:1:1, and the second negative-electrode mixture slurry was prepared by using water as a dispersion medium.

[Production of a Negative Electrode]

A coating of the first negative-electrode mixture slurry was applied to each side of the negative-electrode current collector composed of copper foil, the coating was dried and rolled, a coating of the second negative-electrode mixture slurry was applied onto the coating, and the coating was dried and rolled, so that a negative-electrode active material layer was formed with a first layer of the first negative-electrode mixture slurry, and a second layer of the second negative-electrode mixture slurry on the negative-electrode current collector. The negative-electrode active material layer was cut into a predetermined electrode size so as to obtain a negative electrode. The negative-electrode active material layer having a thickness of 160 μm (except for the negative-electrode current collector) was formed with application of equal amounts of the first and second negative-electrode mixture slurry. During the production of the negative electrode, the measured compression moduli of the first and second layers were 660 MPa and 830 MPa (see other physical properties in Table 1).

[Preparation of an Electrolytic Solution]

Ethylene carbonate (EC), methyl ethyl carbonate (EMC), and dimethyl carbonate (DMC) were mixed at a volume ratio of 3:3:4. An electrolytic solution was prepared by dissolving $LiPF_6$ with a concentration of 1.4 mol/L in the mixed solvent.

[Production of the Electrical Storage Device]

Negative electrodes, separators with a compression modulus of 230 MPa, and positive electrodes were sequentially stacked to produce an electrode body. The negative electrodes and the positive electrodes were connected to the positive terminal and the negative terminal, which had been attached to the sealing plate, and then were inserted with the electrolytic solution into a rectangular outer can. The opening of the outer can was sealed with the sealing plate, completing the production of the electrical storage device.

[Production of the Electrical Storage Module]

The produced electrical storage device was held by a pair of elastic bodies (a urethane foam sheet having a compression modulus of 120 MPa) to oppose the long lateral face and was held and fixed by a pair of end plates, so that the electrical storage module was produced. The elastic body is disposed so as to receive a load from the electrode body in the stacking direction of the electrode body when the electrode body expands.

Example 2

The electrical storage module was produced as in Example 1 except that the separator with a compression modulus of 120 MPa was used and the elastic body was a urethane foam sheet having a compression modulus of 60 MPa.

Example 3

The electrical storage module was produced as in Example 1 except that the separator had a compression modulus of 120 MPa and the elastic body was a pair of nitrile rubber sheets having a compression modulus of 5 MPa.

Example 4

The electrical storage module was produced as in Example 1 except that the separator with a compression modulus of 80 MPa was used and the elastic body was a pair of urethane foam sheets having a compression modulus of 40 MPa.

Example 5

The electrical storage module was produced as in Example 2 except that the negative-electrode active material was a surface-modified carbon material C having a BET specific surface area of 1 $m^2/g$ and coated with an amorphous carbon film of 1.5 mass % on the surfaces of graphite particles in the preparation of the second negative-electrode mixture slurry. During the production of the negative electrode, the measured compression moduli of the first and second layers were 660 MPa and 1200 MPa.

Example 6

The electrical storage module was produced as in Example 2 except that the negative-electrode active material was a surface-modified carbon material D having a BET specific surface area of 0.9 $m^2/g$ and coated with an amorphous carbon film of 3.0 mass % on the surfaces of graphite particles in the preparation of the second negative-electrode mixture shiny. During the production of the negative electrode, the measured compression moduli of the first and second layers were 660 MPa and 1250 MPa.

Example 7

The electrical storage module was produced as in Example 2 except that the negative-electrode active material was a surface-modified carbon material E having a BET specific surface area of 4.4 $m^2/g$ and coated with an amorphous carbon film of 0.6 mass % on the surfaces of graphite particles in the preparation of the first negative-electrode mixture shiny. During the production of the negative electrode, the measured compression moduli of the first and second layers were 420 MPa and 830 MPa.

Example 8

The electrical storage module was produced as in Example 2 except that the negative-electrode active material was a surface-modified carbon material E in the preparation of the first negative-electrode mixture slurry, a roll force applied to a coating of the first negative-electrode mixture slurry was increased by 0.75 times, and a roll force applied to a coating of the second negative-electrode mixture slurry was increased by 0.7 times in the production of the negative electrode. During the production of the negative electrode, the measured compression moduli of the first and second layers were 250 MPa and 620 MPa.

Example 9

The electrical storage module was produced as in Example 2 except that the negative-electrode active material was the surface-modified carbon material A in the preparation of the first negative-electrode mixture slurry, a roll force applied to a coating of the first negative-electrode mixture slurry was increased by 0.8 times, and the negative-electrode active material was a surface-modified carbon material F having a BET specific surface area of 3.5 $m^2/g$ and coated with an amorphous carbon film of 2.0 mass % on the surfaces of graphite particles in the preparation of the second negative-electrode mixture slurry. During the production of the negative electrode, the measured compression moduli of the first and second layers were 900 MPa and 320 MPa.

Comparative Example 1

A coating of the second negative-electrode mixture slurry of Example 1 was applied to each side of the negative-electrode current collector composed of copper foil, and then the coating was dried and rolled, so that a negative-electrode active material layer of the second negative-electrode mixture slurry was formed on the negative-electrode current collector. The negative-electrode active material layer was cut into a predetermined electrode size so as to obtain a negative electrode. The electrical storage module was produced as in Example 1 except that the negative electrode was used and the elastic body was a pair of polyethlene terephthalate sheets having a compression modulus of 2800 MPa. During the production of the negative electrode, the measured compression modulus of the negative-electrode active material layer was 830 MPa.

Comparative Example 2

The electrical storage module was produced as in Comparative Example 1 except that the negative-electrode active material was the surface-modified carbon material A in the preparation of the negative-electrode mixture slurry, and a roll force applied to a coating of the negative-electrode mixture slurry was increased by 0.6 times in the production of the negative electrode. During the production of the negative electrode, the measured compression modulus of the negative-electrode active material layer was 200 MPa.

Comparative Example 3

The electrical storage module was produced as in Comparative Example 1 except that the elastic body was a urethane foam sheet having a compression modulus of 120 MPa.

[Measurement of an Initial Resistance (IV Resistance)]

The initial resistances of the electrical storage devices according to the examples and the comparative examples were measured under the following conditions: The electrical storage device adjusted in a charging state of SOC 60% was subjected to constant current discharge at a temperature of 25° C. at 5 C rate for ten seconds, so that a voltage drop (V) was calculated. The value (V) of the voltage drop was divided by a corresponding current value (I) to calculate an IV resistance (mΩ), and then the mean value of the resistance was determined as an initial resistance.

[High-Rate Charge and Discharge Test]

Subsequently, for the electrical storage modules according to the examples and the comparative examples, a charge and discharge cycle test was conducted such that ten cycles of charge and discharge were repeated at a temperature of 25° C. After the cycle test, a rate of increase in battery resistance was measured. In one cycle of the charge and discharge cycle test, constant current charge was performed at a charge rate of 1.5 C for 4300 seconds, the charge was suspended for ten seconds, constant current discharge was performed at a discharge rate of 1.5 C for 4300 seconds, and then the discharge was suspended for ten seconds. Subsequently, the resistances (IV resistances) of the electrical storage modules after the charge and discharge cycle test were measured by the same method as the measurement of the initial resistance, and a rate of increase in battery resistance was measured. The test was repeated until the rate of increase reached 200%. The larger the number of cycles until the rate of increase reaches 200%, the smaller the increase in resistance during high-rate charge and discharge.

[Measurement of a Capacity Maintenance Rate in Charge and Discharge Cycle Characteristics]

For the electrical storage modules of the examples and the comparative examples, constant current charge was performed until a battery voltage reached 4.2 V at a temperature of 25° C. at a constant current of 0.33 C, and then constant current discharge was performed until the battery voltage reached 3.0 V at a constant current of 0.33 C. The charge and discharge cycle was performed 500 times, and capacity maintenance rates in the charge and discharge cycles of the electrical storage modules were determined by the formula below. The higher the capacity maintenance rate, the smaller the reduction in capacity in the charge and discharge cycle.

Capacity maintenance rate=(discharged capacity in the 500-th cycle/discharged capacity in the first cycle)×100

Table 1 shows the physical properties of the negative-electrode active material layers (the first layer and the second layer) of the examples and the comparative examples. Table 2 shows the compression moduli of the negative-electrode active material layers (the first layer and the second layer), the compression moduli of the separator, and the compression moduli of the elastic body according to the examples and the comparative examples, and the test results of the examples and the comparative examples.

TABLE 1

| | SECOND LAYER | | | | | | FIRST LAYER | | | | | |
|---|---|---|---|---|---|---|---|---|---|---|---|---|
| | NEGATIVE-ELECTRODE ACTIVE MATERIAL | | | | | | NEGATIVE-ELECTRODE ACTIVE MATERIAL | | | | | |
| | BET $(m^2/g)$ | AMORPHOUS CARBON FILM AMOUNT (wt. %) | 10% PROOF STRESS (MPa) | PARTICLE-INTERNAL POROSITY RATE (%) | POROSITY RATE (%) | COMPRESSION MODULUS (MPa) | BET $(m^2/g)$ | AMORPHOUS CARBON FILM AMOUNT (wt. %) | 10% PROOF STRESS (MPa) | PARTICLE-INTERNAL POROSITY RATE (%) | POROSITY RATE (%) | COMPRESSION MODULUS (MPa) |
| EXAMPLE 1 | 2.9 | 1.5 | 5.7 | 5 | 24 | 830 | 3.9 | 0.6 | 2.1 | 10 | 22 | 660 |
| EXAMPLE 2 | 2.9 | 1.5 | 5.7 | 5 | 24 | 830 | 3.9 | 0.6 | 2.1 | 10 | 22 | 660 |
| EXAMPLE 3 | 2.9 | 1.5 | 5.7 | 5 | 24 | 830 | 3.9 | 0.6 | 2.1 | 10 | 22 | 660 |
| EXAMPLE 4 | 2.9 | 1.5 | 5.7 | 5 | 24 | 830 | 3.9 | 0.6 | 2.1 | 10 | 22 | 660 |
| EXAMPLE 5 | 1 | 1.5 | 44 | 0 | 26 | 1200 | 3.9 | 0.6 | 2.1 | 10 | 22 | 660 |
| EXAMPLE 6 | 0.9 | 3 | 27 | 7 | 26 | 1250 | 3.9 | 0.6 | 2.1 | 10 | 22 | 660 |
| EXAMPLE 7 | 2.9 | 1.5 | 5.7 | 5 | 24 | 830 | 4.4 | 0.6 | 1.8 | 15 | 23 | 420 |
| EXAMPLE 8 | 2.9 | 1.5 | 5.7 | 5 | 31 | 620 | 4.4 | 0.6 | 1.8 | 15 | 28 | 250 |
| EXAMPLE 9 | 3.5 | 2 | 11 | 3 | 23 | 900 | 3.9 | 0.6 | 2.1 | 10 | 25 | 320 |
| COMPARATIVE | 2.9 | 1.5 | 5.7 | 5 | 24 | 830 | — | — | — | — | — | — |

TABLE 1-continued

| | SECOND LAYER | | | | | | FIRST LAYER | | | | | |
|---|---|---|---|---|---|---|---|---|---|---|---|---|
| | NEGATIVE-ELECTRODE ACTIVE MATERIAL | | | | | | NEGATIVE-ELECTRODE ACTIVE MATERIAL | | | | | |
| | BET ($m^2/g$) | AMORPHOUS CARBON FILM AMOUNT (wt. %) | 10% PROOF STRESS (MPa) | PARTICLE-INTERNAL POROSITY RATE (%) | POROSITY RATE (%) | COMPRESSION MODULUS (MPa) | BET ($m^2/g$) | AMORPHOUS CARBON FILM AMOUNT (wt. %) | 10% PROOF STRESS (MPa) | PARTICLE-INTERNAL POROSITY RATE (%) | POROSITY RATE (%) | COMPRESSION MODULUS (MPa) |
| EXAMPLE 1 | | | | | | | | | | | | |
| COMPARATIVE EXAMPLE 2 | 3.9 | 0.6 | 2.1 | 10 | 36 | 200 | — | — | — | — | — | — |
| COMPARATIVE EXAMPLE 3 | 2.9 | 1.5 | 5.7 | 5 | 24 | 830 | — | — | — | — | — | — |

TABLE 2

| | SECOND LAYER COMPRESSION MODULUS (MPa) | FIRST LAYER COMPRESSION MODULUS (MPa) | SEPARATOR COMPRESSION MODULUS (MPa) | ELASTIC BODY COMPRESSION MODULUS (MPa) | TEST RESULT | |
|---|---|---|---|---|---|---|
| | | | | | CAPACITY MAINTENANCE RATE (%) | NUMBER OF CYCLES (300% INCREASE IN RESISTANCE) (NUMBER OF CYCLES) |
| EXAMPLE 1 | 830 | 660 | 230 | 120 | 84 | 120 |
| EXAMPLE 2 | 830 | 660 | 120 | 60 | 85 | 170 |
| EXAMPLE 3 | 830 | 660 | 120 | 5 | 84 | 220 |
| EXAMPLE 4 | 830 | 660 | 80 | 40 | 84 | 130 |
| EXAMPLE 3 | 1200 | 660 | 120 | 60 | 86 | 180 |
| EXAMPLE 6 | 1250 | 660 | 120 | 60 | 86 | 190 |
| EXAMPLE 7 | 830 | 420 | 120 | 60 | 89 | 120 |
| EXAMPLE 8 | 620 | 250 | 120 | 60 | 90 | 180 |
| EXAMPLE 9 | 900 | 320 | 120 | 60 | 83 | 120 |
| COMPARATIVE EXAMPLE 1 | 830 | — | 230 | 2800 | 75 | 30 |
| COMPARATIVE EXAMPLE 2 | 200 | — | 230 | 120 | 82 | 50 |
| COMPARATIVE EXAMPLE 3 | 830 | — | 230 | 120 | 79 | 80 |

According to Examples 1 to 8 in which a compression modulus satisfies the relationship of the second layer near the surface>the first layer near the negative-electrode current collector>the separator>the elastic body, higher capacity maintenance rates and lower rates of increase in resistance were obtained as compared with Comparative Examples 1 to 3 in which compression modulus does not satisfy the relationship. Furthermore. Examples 1 to 8 suppressed a reduction in capacity maintenance rate in a charge and discharge cycle and an increase in resistance during high-rate charge and discharge.

REFERENCE SIGNS LIST

1 Electrical storage module
2 Electrical storage stack
4 End plate
6 Locking member
8 Cooling plate
Electrical storage device
12 Insulating spacer
13 Housing
14 Outer can
16 Sealing plate
18 Output terminal
38 Electrode body
38a Positive electrode
38b Negative electrode
38d Separator
39 Winding core
40 Elastic body
42 Hard portion
42a Substrate
44 Soft portion
44a Through hole
46 Recessed portion
46a Core portion
46b Linear portion
50 Negative-electrode current collector
52 Negative-electrode active material layer
52a First layer
52b Second layer

The invention claimed is:
1. An electrical storage module comprising: at least one electrical storage device, and an elastic body that is placed with the electrical storage device and receives a load from the electrical storage device in a placement direction of the elastic body,
wherein the electrical storage device includes an electrode body in which a positive electrode, a negative elec- trode, and a separator disposed between the positive electrode and the negative electrode are stacked, and a housing accommodating the electrode body, the negative electrode includes a negative-electrode current collector, and a negative-electrode active material layer that is formed on the negative-electrode current collector and contains negative-electrode active material particles, the negative-electrode active material layer including a first layer formed on the negative-electrode current collector, and a second layer that is formed on the first layer and has a higher compression modulus than the first layer, the separator has a lower compression modulus than the first layer, and the elastic body has a lower compression modulus than the separator.

2. The electrical storage module according to claim 1, wherein the negative-electrode active material particles contained in the second layer have a smaller BET specific surface area than the negative-electrode active material particles contained in the first layer.

3. The electrical storage module according to claim 1, wherein the negative-electrode active material particles contained in the second layer contain a surface-modified carbon material with a surface of a carbon material coated with an amorphous carbon film, and a content of the amorphous carbon film is at least 1.5 mass % relative to the surface-modified carbon material.

4. The electrical storage module according to claim 1, wherein the negative-electrode active material particles contained in the first layer contain a carbon material, and the carbon material has a particle-internal porosity rate of at least 10%.

5. The electrical storage module according to claim 1, wherein the second layer has a higher porosity rate than the first layer.

6. The electrical storage module according to claim 1, wherein the elastic body has a compression modulus of at most 120 MPa.

7. The electrical storage module according to claim 1, wherein the elastic body is a stack of a plurality of elastic sheets.

8. The electrical storage module according to claim 1, wherein the elastic body has a soft portion, and a hard portion placed on an outer edge of the elastic body with respect to the soft portion, the soft portion being more deformable than the hard portion.

9. The electrical storage module according to claim 1, wherein the elastic body has a hard portion, and a soft portion more deformable than the hard portion, the hard portion is deformed by the load not smaller than a predetermined load, and the elastic body shifts, in response to deformation of the hard portion, from a first state in which the load is received by the hard portion to a second state in which the load is received by the sail portion.

10. An electrical storage device comprising: an electrode body in which a positive electrode, a negative electrode, and a separator disposed between the positive electrode and the negative electrode are stacked, an elastic body configured to receive a load from the electrode body in an stacking direction of the electrode body, and a housing accommodating the electrode body and the elastic body, wherein the negative electrode includes a negative-electrode current collector, and a negative-electrode active material layer that is formed on the negative-electrode current collector and contains negative-electrode active material particles, the negative-electrode active material layer including a first layer formed on the negative-electrode current collector, and a second layer that is formed on the first layer and has a higher compression modulus than the first layer, the separator has a lower compression modulus than the first layer, and the elastic body has a lower compression modulus than the separator.

* * * * *